US009877290B2

(12) United States Patent
Aiba et al.

(10) Patent No.: US 9,877,290 B2
(45) Date of Patent: Jan. 23, 2018

(54) COMMUNICATION METHOD AND SYSTEM FOR PHYSICAL UPLINK CONTROL CHANNEL RESOURCE ASSIGNMENT, AND BASE STATION, USER EQUIPMENT AND INTEGRATED CIRCUIT THEREIN

(75) Inventors: Tatsushi Aiba, Osaka (JP); Lei Huang, Osaka (JP); Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 375 days.

(21) Appl. No.: 13/641,933

(22) PCT Filed: Apr. 14, 2011

(86) PCT No.: PCT/JP2011/059769
§ 371 (c)(1),
(2), (4) Date: Oct. 18, 2012

(87) PCT Pub. No.: WO2011/132721
PCT Pub. Date: Oct. 27, 2011

(65) Prior Publication Data
US 2013/0034073 A1 Feb. 7, 2013

(30) Foreign Application Priority Data
Apr. 22, 2010 (JP) ................................. 2010-098922

(51) Int. Cl.
H04W 52/32 (2009.01)
H04L 1/00 (2006.01)
(Continued)

(52) U.S. Cl.
CPC ......... *H04W 52/325* (2013.01); *H04L 1/0026* (2013.01); *H04L 1/1671* (2013.01);
(Continued)

(58) Field of Classification Search
CPC . H04W 52/325; H04W 52/34; H04W 52/146; H04W 72/0413; H04W 72/1273;
(Continued)

(56) References Cited

U.S. PATENT DOCUMENTS

2011/0165906 A1* 7/2011 Papasakellariou et al. .. 455/522
2011/0237283 A1* 9/2011 Shan et al. ..................... 455/509
(Continued)

FOREIGN PATENT DOCUMENTS

WO   WO 2009/154839 A2   12/2009

OTHER PUBLICATIONS

3GPP TS 36.213 v8.8.0 "3rd Generation Partnership Project; Technical Specification Group Radio Access Network; Evolved Universal Terrestrial Radio Access (E-UTRA); Physical layer procedures (Release 8)", Sep. 2009.
(Continued)

*Primary Examiner* — Habte Mered
(74) *Attorney, Agent, or Firm* — Birch, Stewart, Kolasch & Birch, LLP

(57) ABSTRACT

A communication system in which a base station apparatus and a user equipment communicate on multiple component carriers comprising primary component carrier and non-primary component carrier, the base station apparatus, transmits, to the user equipment, four indices for physical uplink control channel resource using higher layer signaling, transmits, to the user equipment, an index indicator using transmission power control command for physical uplink control channel field, the user equipment, determines an index among the four indices according to the index indicator, transmits, to the base station apparatus, HARQ-ACK/NACK using physical uplink control channel resource the index, wherein the transmission power control command for physical uplink control channel field is included in a down-
(Continued)

link control information format, which is used to schedule a physical downlink shared channel on the non-primary component carrier.

12 Claims, 8 Drawing Sheets

(51) Int. Cl.
| | |
|---|---|
| *H04L 1/16* | (2006.01) |
| *H04L 1/18* | (2006.01) |
| *H04L 5/00* | (2006.01) |
| *H04W 52/14* | (2009.01) |
| *H04W 72/04* | (2009.01) |
| *H04W 72/12* | (2009.01) |
| *H04W 52/34* | (2009.01) |

(52) U.S. Cl.
CPC ............ *H04L 1/1887* (2013.01); *H04L 5/001* (2013.01); *H04L 5/0007* (2013.01); *H04L 5/0053* (2013.01); *H04L 5/0055* (2013.01); *H04W 52/146* (2013.01); *H04W 52/34* (2013.01); *H04W 72/0413* (2013.01); *H04W 72/1273* (2013.01)

(58) Field of Classification Search
CPC ... H04L 1/0026; H04L 1/1671; H04L 1/1887; H04L 5/0007; H04L 5/001; H04L 5/0053; H04L 5/0055

See application file for complete search history.

(56) References Cited

U.S. PATENT DOCUMENTS

2012/0224553 A1* 9/2012 Kim et al. .................... 370/329
2014/0153492 A1* 6/2014 Papasakellariou et al. .. 370/328

OTHER PUBLICATIONS

Ericsson, "Carrier aggregation in LTE-Advanced", 3GPP TSG-RAN WG1 Meeting #53bis, R1-082468, Jun. 2008.
Huawei, "UL ACK/NACK feedback related DCI design for carrier aggregation", 3GPP TSG RAN WG1 Meeting #60bis, R1-101943, Apr. 12-16, 2010.
International Search Report for PCT/JP2011/059769 dated May 24, 2011.
Zte, "ACK/NACK Design for LTE-Advanced", 3GPP TSG-RAN WG1 Meeting #60, R1-101398, Feb. 22-26, 2010.
Zte, "Uplink Control Channel Design for LTE-Advanced", 3GPP TSG RAN WG1 Meeting #56, R1-090629, Feb. 9-13, 2009.
Samsung, "PUCCH HARQ-ACK Resource Indexing for DL CA", 3GPP TSG RAN WG1 #60bis, Beijing, China, Apr. 12-16, 2010, pp. 1-5, XP50419457A, R1-102171.

* cited by examiner

COMMUNICATION METHOD AND SYSTEM FOR PHYSICAL UPLINK CONTROL CHANNEL RESOURCE ASSIGNMENT, AND BASE STATION, USER EQUIPMENT AND INTEGRATED CIRCUIT THEREIN

TECHNICAL FIELD

The present invention relates to a communication technique, and particularly, to a communication method and system for PUCCH (physical uplink control channel) resource assignment and a base station, a user equipment and integrated circuits used therein.

BACKGROUND ART

3GPP (The 3rd Generation Partner Project) standardization organization is working out the next generation of wireless communication standard which is named LTE (Long Term Evolution). In a physical layer interface, new standard adopts OFDM (Orthogonal Frequency Division Multiplexing) technology, which is different from conventional CDMA (Code Division Multiple Access) technology. In LTE, OFDMA (Orthogonal Frequency Division Multiple Access) is used in downlinks (DL) and SC-FDMA (Single Carrier Frequency Division Multiple Access) is used in uplinks (UL). The technology used in the new standard is effective for multi-path propagation, with adoption of frequency domain equalization reducing complexity of the conventional time domain equalization, and is more suitable for wider bandwidth high-speed data transmission.

According to the current standardization of LTE (see Non-Patent Document 1 below), PUCCH assignment includes two cases. In case of a PDSCH (Physical Downlink Shared Channel) transmission indicated by the detection of a corresponding PDCCH (Physical Downlink Control Channel) in subframe n−4, or for a PDCCH indicating downlink SPS (Semi-Persistent Scheduling) release in subframe n−4, the UE (User Equipment) shall use PUCCH resource $n_{PUCCH}^{(1)} = n_{CCE} + N_{PUCCH}^{(1)}$ for transmission of HARQ (Hybrid Automatic Repeat reQuest)-ACK (ACKnowledge)/NACK (Negative ACKnowledge) in subframe n, where $n_{CCE}$ is the number of the first CCE (Control Channel Element) used for transmission of corresponding DCI (Downlink Control Information) assignment and $N_{PUCCH}^{(1)}$ is a parameter configured cell-specifically by higher layer signaling. In case of a PDSCH transmission where there is not a corresponding PDCCH detected in subframe n−4, the PUCCH resource, i.e., the value of $n_{PUCCG}^{(1)}$, is determined according to 4 PUCCH resource candidates transmitted by higher layer signaling and the PUCCH resource index transmitted in the DCI format, which indicates a semi-persistent downlink scheduling activation.

The 3GPP is also working out LTE-Advanced (Advanced-LTE) which is likely major enhancements to LTE. The LTE-Advanced will be introduced into Release 10 after a correction and improvement phase in LTE Release 9. The LTE-Advanced shall fulfill requirements as set by ITU (International Telecommunication Union). In LTE-Advanced, the size of UCI (Uplink Control Information, e.g., HARQ-ACK/NACK, CQI (Channel Quality Indicator), SR (Scheduling Request)) will increase due to, e.g., downlink cooperative multipoint (CoMP) transmissions, carrier aggregation, and/or higher order MIMO (Multiple In Multiple Out).

Carrier aggregation, where two or more component carriers are aggregated, is considered for LTE-Advanced in order to support downlink transmission bandwidth larger than 20 MHz, up to 100 MHz (see Non-Patent Document 2 below). From a UE perspective, there is one transport block (in absence of spatial multiplexing) and one HARQ entity per scheduled component carrier. A UE may be scheduled over multiple component carriers and each transport block is mapped within a single component carrier.

Regarding the PUCCH transmission in the LTE-Advanced, several solutions were proposed by some companies (see Non-Patent Document 3). The most straightforward choice is to utilize the same PUCCH structure as in LTE Rel-8 if simultaneous transmission of PUCCH on multiple resource blocks (across different uplink component carriers or within one uplink component carrier) is supported. HARQ ACK/NACK bundling structure, which is the default ACK/NACK feedback mode for TDD (Time Division Duplex) in LTE Rel-8, could be introduced as a solution for PUCCH transmission in LTE-Advanced. In addition, multiplexing structure is also one proposed solution. For multiplexing, multiple HARQ-ACK/NACK feedback bits corresponding to the PDSCHs from different downlink component carriers will be transmitted in one uplink component carrier in the similar way as TDD HARQ-ACK/NACK multiplexing scheme in LTE-Rel-8, which is called as HARQ-ACK/NACK multiplexing using PUCCH format 1b with channel selection.

Non-Patent Document 1: "3GPP TSG RAN E-UTRA Physical layer procedure (Release 8)", 3GPP TS 36.213 V8.8.0, 2009-09

Non-Patent Document 2: "Carrier aggregation in LTE-Advanced", 3GPP TSG RAN WG1 Meeting #53bis, R1-082468, June, 2008

Non-Patent Document 3: "Uplink control channel design for LTE-Advanced", 3GPP TSG RAN WG1 Meeting #56, R1-090629, February, 2009

However, in the above conventional techniques, there is no concrete description on how to assign resources for PUCCH, on which the UCI (e.g., HARQ-ACK/NACK, CQI, SR) for multiple component carriers is transmitted.

All above conventional techniques try to reuse PUCCH structure and resources defined in LTE Rel-8 for the UCI (e.g., HARQ-ACK/NACK, CQI, SR) transmission in LTE-Advanced. However none of them can meet the system requirement well in case of carrier aggregation. Another promising solution is to introduce the PUCCH format (i.e., UCI format) in which the UCI (e.g., HARQ-ACK/NACK, CQI, SR) for multiple component carriers is transmitted. Regarding this solution, the PUCCH resource assignment schemes should be re-considered since the current PUCCH resource assignment in LTE Rel-8 will not be suitable anymore.

The present invention has been made in view of the foregoing circumstances, and its object is to provide a mobile communication method, system, a base station and a user equipment and integrated circuits used therein, which may perform flexible resource assignment for physical uplink control channel, and achieve more efficient transmission control (scheduling) between the eNB (Evolved Node B) and the UE.

SUMMARY OF INVENTION

Some embodiments of the present invention disclose a communication system in which a base station apparatus and a user equipment communicate on multiple component carriers comprising primary component carrier and non-primary component carrier. In the communication system, the base station apparatus, transmits, to the user equipment, four indices for physical uplink control channel resource using higher layer signaling, transmits, to the user equipment, an index indicator using transmission power control command for physical uplink control channel field, the user equipment, determines an index among the four indices according to the index indicator, transmits, to the base station apparatus, HARQ-ACK/NACK using physical uplink control channel resource with the index, wherein the transmission power control command for physical uplink control channel field is included in a downlink control information format, which is used to schedule a physical downlink shared channel on the non-primary component carrier.

Some embodiments of the present invention disclose a base station apparatus in a communication system in which a base station apparatus and a user equipment communicate on multiple component carriers comprising primary component carrier and non-primary component carrier. The base station apparatus comprises: a unit for transmitting, to the user equipment, four indices for physical uplink control channel resource using higher layer signaling, a unit for transmitting, to the user equipment, an index indicator using transmission power control command for physical uplink control channel field, a unit for receiving, from the user equipment, HARQ-ACK/NACK using physical uplink control channel resource with an index, wherein the index is determined, by the user equipment, among the four indices according to the index indicator, and the transmission power control command for physical uplink control channel field is included in a downlink control information format, which is used to schedule a physical downlink shared channel on the non-primary component carrier.

Some embodiments of the present invention disclose a user equipment in a communication system in which a base station apparatus and a user equipment communicate on multiple component carriers comprising primary component carrier and non-primary component carrier. The user equipment comprises: a unit for configuring four indices for physical uplink control resource based on higher layer signaling received from the base station apparatus, a unit for determining an index among the four indices according to an index indicator, a unit for transmitting, to the base station apparatus, HARQ-ACK/NACK using physical uplink control channel resource with the index, wherein, the index indicator is transmitted, by the base station apparatus, using transmission power control command for physical uplink control channel field, and the transmission power control command for physical uplink control channel field is included in a downlink control information format, which is used to schedule a physical downlink shared channel on the non-primary component carrier.

Some embodiments of the present invention disclose a method of a base station apparatus in a communication system in which a base station apparatus and a user equipment communicate on multiple component carriers comprising primary component carrier and non-primary component carrier. The method comprises: transmitting, to the user equipment, four indices for physical uplink control channel resource using higher layer signaling, transmitting, to the user equipment, an index indicator with using transmission power control command for physical uplink control channel field, receiving, from the user equipment, HARQ-ACK/NACK using physical uplink control channel resource with an index, wherein the index is determined, by the user equipment, among the four indices according to the index indicator, and the transmission power control command for physical uplink control channel field is included in a downlink control information format, which is used to schedule a physical downlink shared channel on the non-primary component carrier.

Some embodiments of the present invention disclose a method of a user equipment in a communication system in which a base station apparatus and a user equipment communicate on multiple component carriers comprising primary component carrier and non-primary component carrier. The method comprises: configuring four indices for physical uplink control resource based on higher layer signaling received from the base station apparatus, determining an index among the four indices according to an index indicator, transmitting, to the base station apparatus, HARQ-ACK/NACK using physical uplink control channel resource with the index, wherein, the index indicator is transmitted, by the base station apparatus, using transmission power control command for physical uplink control channel field, and the transmission power control command for physical uplink control channel field is included in a downlink control information format, which is used to schedule a physical downlink shared channel on the non-primary component carrier.

Some embodiments of the present invention disclose an integrated circuit mounted in a base station apparatus in a communication system in which a base station apparatus and a user equipment communicate on multiple component carriers comprising primary component carrier and non-primary component carrier. The integrated circuit comprises: a logic element for transmitting, to the user equipment, four indices for physical uplink control channel resource using higher layer signaling, a logic element transmitting, to the user equipment, an index indicator using transmission power control command for physical uplink control channel field, a logic element receiving, from the user equipment, HARQ-ACK/NACK using physical uplink control channel resource with an index, wherein the index is determined, by the user equipment, among the four indices according to the index indicator, and the transmission power control command for physical uplink control channel field is included in a downlink control information format, which is used to schedule a physical downlink shared channel on the non-primary component carrier.

Some embodiments of the present invention disclose an integrated circuit mounted in a user equipment in a communication system in which a base station apparatus and a user equipment communicate on multiple component carriers comprising primary component carrier and non-primary component carrier. The integrated circuit comprises: a logic element for configuring four indices for physical uplink control resource based on higher layer signaling received from the base station apparatus, a logic element for determining an index among the four indices according to an index indicator, a logic element for transmitting, to the base station apparatus, HARQ-ACK/NACK using physical uplink control channel resource with the index, wherein, the index indicator is transmitted, by the base station apparatus, using transmission power control command for physical uplink control channel field, and the transmission power control command for physical uplink control channel field is included in a downlink control information format, which is used to schedule a physical downlink shared channel on the non-primary component carrier.

The foregoing and other objectives, features, and advantages of the invention will be more readily understood upon consideration of the following detailed description of the invention, taken in conjunction with the accompanying drawings.

DESCRIPTION OF EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

To well understand present invention, a carrier aggregation capable wider bandwidth system will be described firstly.

Figure 1:
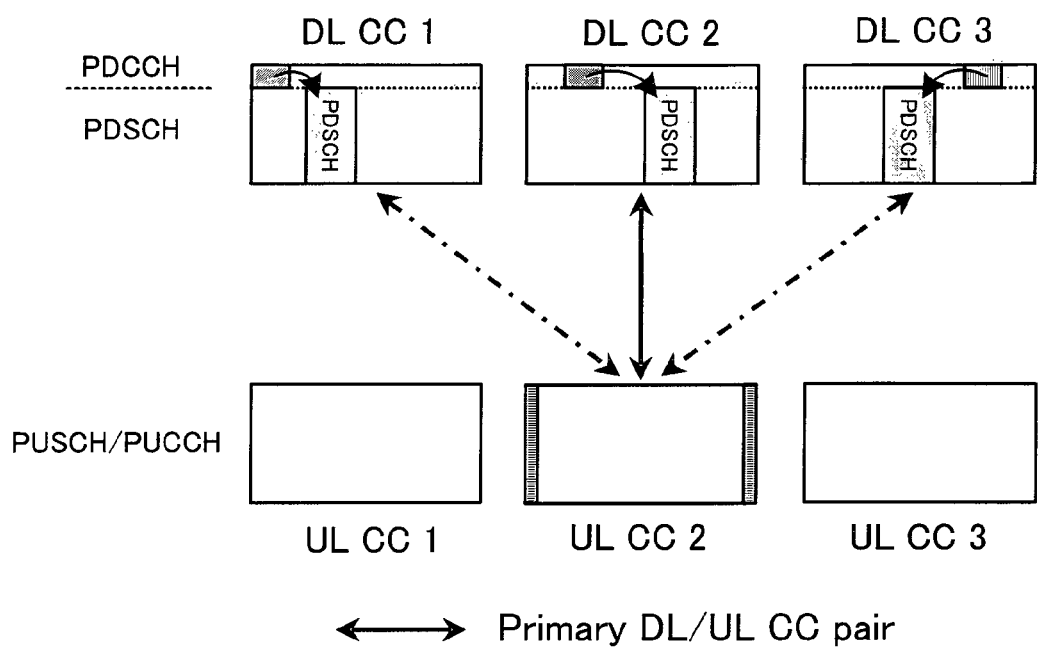
FIG. 1 is a schematic diagram illustrating an example of carrier aggregation capable system configuration according to the present invention.

FIG. 1 shows a system configuration which supports wider transmission bandwidth consisting of several component carriers (i.e., a system supporting carrier aggregation). As the example shown in FIG. 1, three downlink component carriers (DL CC1, DL CC2 and DL CC3) and three uplink component carriers (UL CC1, UL CC2 and UL CC3) are represented. The base station and the UE can perform DL/UL data transmission by utilizing multiple component carriers.

In FIG. 1, the base station can assign, to the UE, PDSCH (Physical Downlink Shared Channel) by using PDCCH (Physical Downlink Control Channel). As shown in FIG. 1, the base station (BS) assigns, to the user equipment (UE), the PDSCH mapped on DL CC1 by PDCCH mapped on DL CC1 (represented by an oblique line block), the PDSCH mapped on DL CC2 by PDCCH mapped on DL CC2 (represented by a cross line block), and the PDSCH mapped on DL CC3 by PDCCH mapped on DL CC3 (represented by a vertical line block). Here, the base station can assign PDSCH on the same or different component carrier as/from where PDCCH is mapped.

In FIG. 1, according to the UE's capability, the base station can configure, to the UE, a DL CC set which is a downlink component carrier set where the PDSCH and/or PDCCH may be mapped according to the scheduling (assignment) of the base station. Moreover the base station may configure, to the UE, a UL CC set which is an uplink component carrier set where the PUSCH (Physical Uplink Shared Channel) and/or PUCCH (Physical Uplink Control Channel) may be mapped according to the scheduling (assignment) of the base station.

Here, in FIG. 1, the base station can configure, to the UE, a primary DL/UL CC pair. For example, the base station can cell-specifically configure, to the UE, the primary DL/UL CC pair by broadcast information (e.g., SIB: System Information Block). Also, for example, the base station can UE-specifically (semi-statically) configure, to the UE, the primary DL/UL CC pair by a dedicated signaling (e.g., a RRC signaling (Radio Resource Control signaling)). The RRC signaling is the signaling exchanged between the base station and the UE on higher-layer (RRC-layer). As an example shown in FIG. 1, the base station configures, to the UE, DL CC2 and UL CC2 as the primary DL/UL CC pair.

Also, in FIG. 1, the base station can configure, to the UE, a primary DL CC. For example, the base station can cell-specifically configure, to the UE, the primary DL CC by broadcast information (e.g., SIB). Also, for example, the base station can UE-specifically (semi-statically) configure, to the UE, the primary DL CC by a dedicated signaling (e.g., the RRC signaling).

Furthermore, in FIG. 1, the base station can configure a primary UL CC to the UE. For example, the base station can cell-specifically configure, to the UE, the primary UL CC by broadcast information (e.g., SIB). Also, for example, the base station can UE-specifically (semi-statically) configure, to the UE, the primary UL CC by a dedicated signaling (e.g., the RRC signaling). As an example shown in FIG. 1, the base station configures, to the UE, DL CC2 as the primary DL CC and the base station configures, to the UE, UL CC2 as the primary UL CC.

The UE transmits, to the base station, the uplink control information on PUCCH mapped only onto the primary UL CC configured by the base station (represented by a solid line arrow). Namely, the UE transmits UCI (e.g., HARQ-ACK/NACK, and/or CQI, and/or SR) on PUCCH mapped on the primary UL CC configured by the base station. FIG. 1 shows that the UE transmits, to the base station, UCI (e.g., HARQ-ACK/NACK, and/or CQI, and/or SR) on PUCCH (represented by horizontal line blocks) on UL CC2 configured by the base station.

For example, the UE can transmit, to the base station, periodic CSI (Channel State Information, including CQI) reporting for DL CCs (e.g., up to 5 DL CCs) on semi-statically configured single UE-specific UL CC. Also, for example, the UE can transmit, to the base station, SR for requesting UL resources (requesting resource assignment for UL transmission) of UL CCs (e.g., up to 5 UL CCs) on the semi-statically configured single UE-specific UL CC. Also, for example, the UE can transmit, to the base station, HARQ-ACK/NACK for downlink transport blocks simultaneously transmitted on DL CCs (e.g., up to 5 DL CCs) on the semi-statically configured single UE-specific UL CC.

Here, the UE can transmit UCI (Uplink Control Information, e.g., HARQ-ACK/NACK, SR, and periodic CSI) on PUCCH mapped on the semi-statically configured single UE-specific UL CC.

Also, in FIG. 1, the base station can activate/deactivate the CCs except the primary DL CC and/or primary UL CC via a MAC signaling (Medium Access Control signaling). The MAC signaling is a signaling exchanged between the base station and the UE on a higher-layer (MAC-layer).

Also the base station can activate/deactivate the DL CCs except the primary DL CC. Namely, the base station can activate, to the UE, the DL CC(s) which are the downlink component carriers where the PDSCH and/or PDCCH may be mapped according to the scheduling (assignment) of the base station. Also, the base station can deactivate, to the UE, the DL CC(s) which are the downlink component carriers where the PDSCH and/or PDCCH may be mapped according to the scheduling (assignment) of the base station.

Also the base station can activate/deactivate the UL CCs except the primary UL CC. Namely, the base station can activate, to the UE, the UL CC(s) which are the uplink component carriers where the PUSCH and/or PUCCH may be mapped according to the scheduling (assignment) of the base station. Also, the base station can deactivate, to the UE, the UL CC(s) which are the uplink component carriers where the PUSCH and/or PUCCH may be mapped according to the scheduling (assignment) of the base station.

Those skilled in the art would appreciate that FIG. 1 is only an example of carrier aggregation capable system and the present invention may be applied to other carrier aggregation capable systems.

Figure 2:
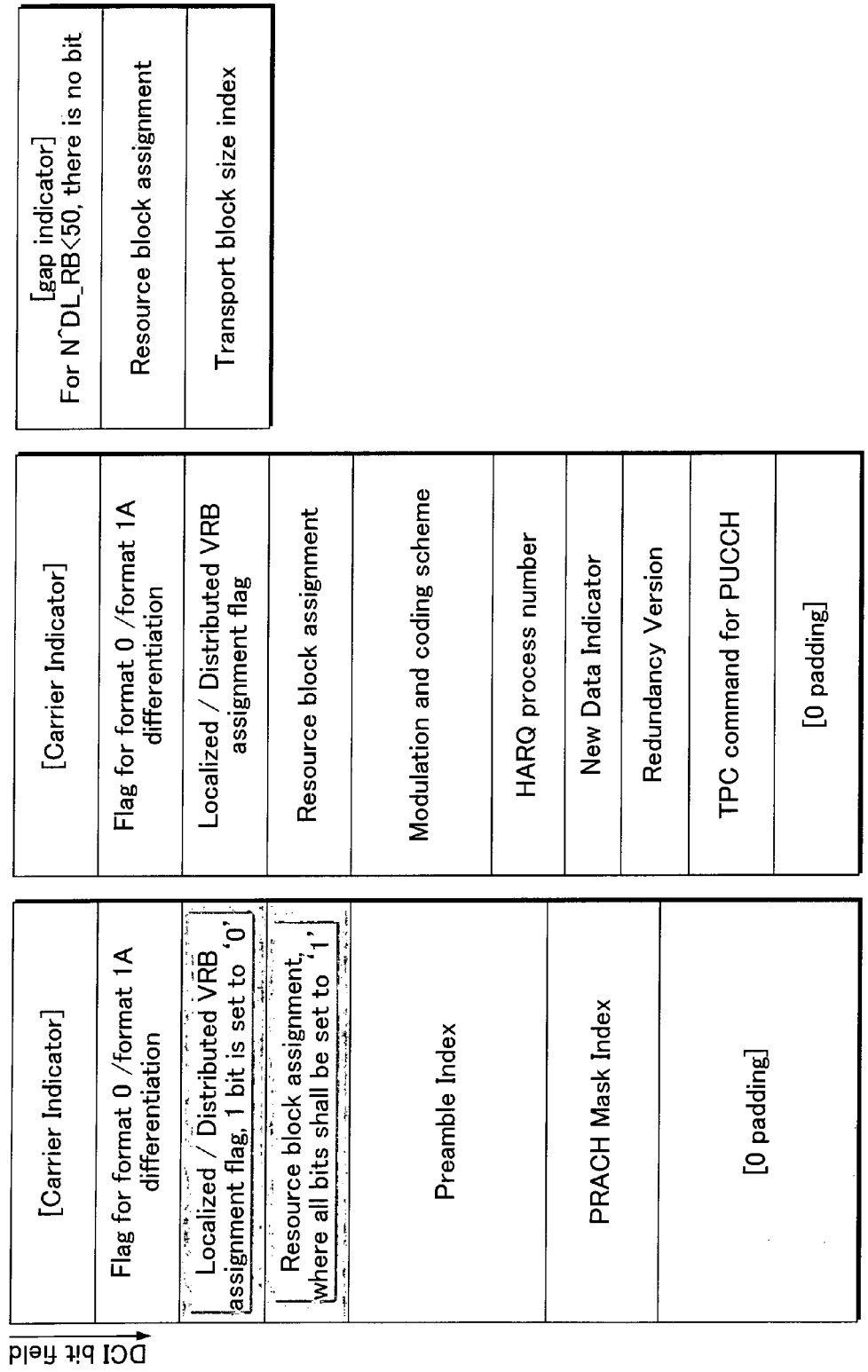
FIG. 2 is a schematic diagram illustrating examples of DCI formats 1A and 1C which could be utilized in the carrier aggregation capable system configuration.

FIG. 2 shows an example of composing form of DCI (Downlink Control Information) format which could be utilized in the carrier aggregation capable system shown in FIG. 1. As the DCI, various DCI formats may be defined depending on the information included (composed of). The left DCI format in FIG. 2 is used for downlink (hereafter, random access scheduling DCI format 1A) and the middle DCI format in FIG. 2 is also used for downlink (hereafter, compact scheduling DCI format 1A). Furthermore, the right DCI format in FIG. 2 is also used for downlink (hereafter, DCI format 1C).

Here, compact scheduling DCI format 1A is used for the compact scheduling of one PDSCH codeword, where the compact scheduling means that the resource block assignment information indicates to a scheduled UE a set of contiguously allocated localized virtual resource blocks (VRB) or distributed virtual resource blocks. The base station assigns, to the user equipment, resource blocks for one PDSCH codeword transmission by using compact scheduling DCI format 1A on PDCCH.

The following information is transmitted by means of the compact scheduling DCI format 1A:

Carrier Indicator—3 bits, where, indicates component carrier the base station assigns PDSCH mapped on (this field is present on CIF (Carrier Indicator Field)-enabled component carriers).

Flag for format 0/format 1A differentiation—1 bit, where, identify DCI format 0 (DCI format for uplink assignment) and DCI format 1A (for downlink) which has the same size of DCI format 0 (value 0 indicates format 0 and value 1 indicates format 1A).

Localized/Distributed VRB assignment flag—1 bit, where this flag indicates VRB type. Here localized VRB and distributed VRB are two VRB types. For localized VRB, a pair of VRBs is mapped to two physical resource blocks on the same frequency over two slots in a subframe. For distributed VRB, a pair of VRB is mapped to two physical resource blocks on two different frequencies over two slots in a subframe.

Resource block assignment—$\lceil \log_2(N_{RB}^{DL}(N_{RB}^{DL}+1)/2) \rceil$ bits, where $N_{RB}^{DL}$ is the resource block number of the component carrier indicated by the carrier indicator in this DCI format. This field indicates the scheduled resource block assignment for PDSCH.

Modulation and coding scheme—5 bits, where indicates the information for modulation and coding scheme.

HARQ process number—3 bits, where indicates the process number.

New Data Indicator—1/bit, where indicates new data, or retransmitted data.

Redundancy version—2 bits, where indicates the redundancy version of the new data or retransmitted data.

TPC (Transmission Power Control) command for PUCCH—2 bits, where indicates the transmission power control for PUCCH.

Padding bits, where zeros will be appended for DCI format 1A until the payload size equals that of DCI format 0 if the number of information bits in DCI format 1A is less than that of DCI format 0.

Referring to the left table in FIG. 2, DCI format 1A (i.e., random access scheduling DCI format 1A) is also used for triggering the random access procedure by a PDCCH command. The base station assigns, to the user equipment, the parameters for random access procedure and triggers its initialization by DCI format 1A. Here, DCI format 1A is used for random access procedure initiated by a PDCCH command only if DCI format 1A CRC (Cyclic redundancy check) is scrambled with C-RNTI (Cell Radio Network Temporary ID) and the predetermined (certain) fields are set as follows:

Localized/Distributed VRB assignment flag, where shall be set to '0'.

Resource block assignment, where all bits shall be set to '1'.

All the remaining bits in compact scheduling DCI format 1A shall be set to '0'.

In case that the above predetermined fields are set to above values (predetermined/certain values), other field(s) in DCI format 1A are realized as follows shown in the left table in FIG. 2:

Preamble Index—6 bits, where indicates the available set of PRACH (Physical Random Access Channel) resources for the transmission of the random access preamble.

PRACH Mask Index—4 bits, where defines in which PRACH resource within a system frame the UE can transmit a random access preamble.

Namely, random access scheduling DCI format 1A is used for random access procedure initiated by a PDCCH command in case that predetermined/specified field(s) in DCI format 1A set to predetermined/specified value(s) (e.g.; set to '0' or '1').

For example, in case that the field for Localized/Distributed VRB assignment flag is set to '0', and the field for Resource block assignment is set to '1', the base station and the user equipment realize DCI format 1A is used for random access procedure initiated by a PDCCH command. In this case, for example, all bits in the field for Resource block assignment are set to value '1'. The base station and the user equipment can realize (acknowledge) other field(s), except for the field for Localized/Distributed VRB assignment flag and the field for Resource block assignment, as field(s) for random access procedure.

The base station transmits, to the user equipment, DCI in which predetermined/specified field(s) is set to predetermined/specified value(s). Receiving this DCI, the user equipment performs the initialization of random access procedure. According to the DCI which sets specified field(s) to specified value(s), the user equipment realizes other field(s) except for the predetermined field(s) as field(s) for random access procedure.

Namely, the base station and the user equipment change the interpretation for fields in DCI format 1A according to the value(s) set in predetermined/specified field(s). Here, it is defined, in advance by the specifications, etc, the interpretation of which field(s) is changed in case that which field in DCI Format 1A is set to which value(s). The base station and the user equipment can change the interpretation of predetermined field(s) (the second predetermined field) according to value(s) of another predetermined field(s) (the first predetermined field).

The base station and the user equipment can share relative information in advance. In this invention, such utilizing of DCI format is also named 'reuse of DCI format'. DCI is transmitted as in above explanation between the base station and the user equipment, the number of blind decoding for the user equipment would not increase.

Furthermore, DCI format 1C is used for very compact scheduling of one PDSCH codeword, where very compact scheduling means that the resource block assignment information indicates to a scheduled UE a set of contiguously allocated distributed virtual resource block groups.

The following information is transmitted by means of the DCI format 1C:

Gap value—1 bit, which indicates the distributed VRB mapping rule.

For $N_{RB}^{DL}<50$, there is no bit for gap indication, where $N_{RB}^{DL}$ is the resource block number of the component carrier on which this DCI format is transmitted.

Resource block assignment—$\lceil \log_2(\lfloor N_{VRB,gap1}^{DL}/N_{RB}^{step} \rfloor \cdot (\lfloor N_{VRB,gap1}^{DL}/N_{RB}^{step} \rfloor +1)/2) \rceil$ bit, where $N_{VRB,gap1}^{DL}$ is the virtual resource block number on the scheduled component carrier and $N_{RB}^{step}$ is the size of a distributed virtual resource block group.

Transport block size index—5 bits, which indicates the transport block size for scheduled PDSCH.

It should be noted that the size of DCI format 1C is much less than that of DCI format 1A. Note that, DCI format 1A and 1C have different payloads. If abstracting bit stream with different size and doing the CRC check, according to the size of successfully checked stream, one dedicated DCI format (1A/1C) could be detected.

<Signaling Communication Flow>

Figure 3:
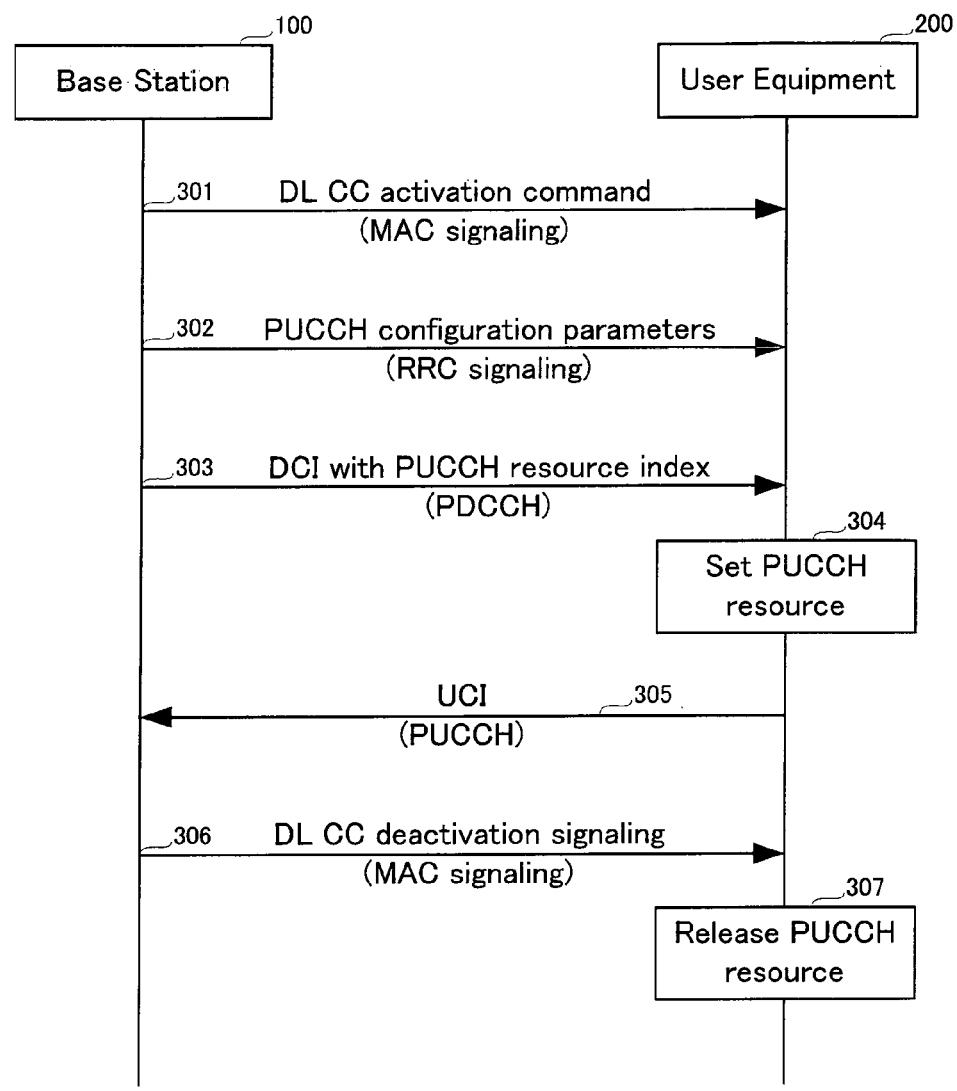
FIG. 3 is a schematic diagram illustrating a signaling communication flow according to an embodiment of the present invention.

FIG. 3 is a schematic diagram illustrating a signaling communication flow for the resource assignment of the physical uplink control signaling according to an embodiment of the present invention.

As shown in FIG. 3, a signaling communication flow for the resource assignment of the physical uplink control signaling according to the present invention comprises following steps. The base station (BS) 100 UE-specifically activates one or multiple downlink component carriers among the configured downlink component carrier set by using, for example, the MAC signaling (Step 301). The base station further UE-specifically configures, to the user equipment, parameters for the PUCCH resource configuration by using, for example, RRC (Radio Resource Control) signaling (Step 302). The UE-specifically configured parameters in the present invention that include the PUCCH resource list, the component carrier index, etc. Here, the PUCCH resource list includes information that indicates one or multiple PUCCH resources which are available candidates for the PUCCH resource(s) where the user equipment transmits UCI (e.g., HARQ-ACK, and/or, CQI, and/or, SR). Also, the component carrier index indicates the component carrier for which the PUCCH resources in PUCCH resource list are configured. Namely, the RRC signaling could be defined to specify the dedicated PUCCH configuration for one specified UE (e.g., UE 200). In the RRC signaling, at least one field is reserved to indicate the available PUCCH resource candidate list where one PUCCH resource candidate could be linked to one physical resource for UE's PUCCH transmission.

After the component carrier(s) is successfully activated and the PUCCH configuration parameters are correctly received, the base station schedules and transmits the PUCCH resource index to the user equipment to indicate the PUCCH resource(s) by using, for example, DCI via PDCCH (Step 303). Namely, the base station indicates, among the candidates in the PUCCH resource list configured by using the RRC signaling, the PUCCH resource(s) for the user equipment to transmit UCI (HARQ-ACK, and/or, CQI, and/or, SR) by using DCI via PDCCH.

After receiving PUCCH resource assignment information transmitted by the DCI, the user equipment sets PUCCH resource(s) for transmitting the UCI (e.g., HARQ-ACK/NACK, and/or CQI, and/or SR) of the activated downlink component carrier(s) (Step 304). The user equipment transmits, to the base station, the UCI of the activated downlink component carriers(s) on the PUCCH resource(s) set in Step 304 (Step 305). Namely, for example, the user equipment transmits, to the base station, uplink control information which indicates HARQ-ACK/NACK for multiple downlink transport block via multiple PDSCH from the base station in the same subframe. Also, for example, the user equipment transmits, to the base station, uplink control information which indicates channel quality of multiple downlink component carriers from the base station in the same subframe. Also, for example, the user equipment transmits, to the base station, uplink control information which requests uplink resource(s) on multiple uplink component carriers to transmit the uplink data.

According to the scheduling, the base station transmits, to the user equipment, the downlink component carrier deactivation signaling by using, for example, the MAC signaling, to deactivate one or multiple downlink component carriers (Step 306). Here, in case that the base station deactivates all downlink component carrier except for the DL primary component carrier, the user equipment releases the PUCCH resource(s) configured by parameters for the PUCCH resource configuration (Step 307).

Above PUCCH resources refer to resource blocks as well as time-domain covers and/or cyclic shifts (exact parameters depend on design details of the PUCCH format). A set of these PUCCH resources with configurable size is specifically reserved for UCI (HARQ-ACK/NACK or/and CQI and/or scheduling request) transmission while the user equipment is scheduled to transmit PDSCH on multiple component carriers. It is noted that this PUCCH resource set is newly defined and different from that specified in LTE Rel-8 for UCI transmission. The base station signals the configuration (e.g., the initial location information and the size information) for the set of the PUCCH resources to the user equipment via dedicated signaling (e.g., RRC signaling) and/or broadcast signaling (e.g., SIB). The PUCCH resource index indicates one dedicated PUCCH resource among the configured PUCCH resource set.

Following embodiments will be described based on the signaling procedure in FIG. 3, however, it will be understood that following examples and embodiments are also able to adopt above signaling procedures or variations for implementing the PUCCH transmission.

Figure 4:
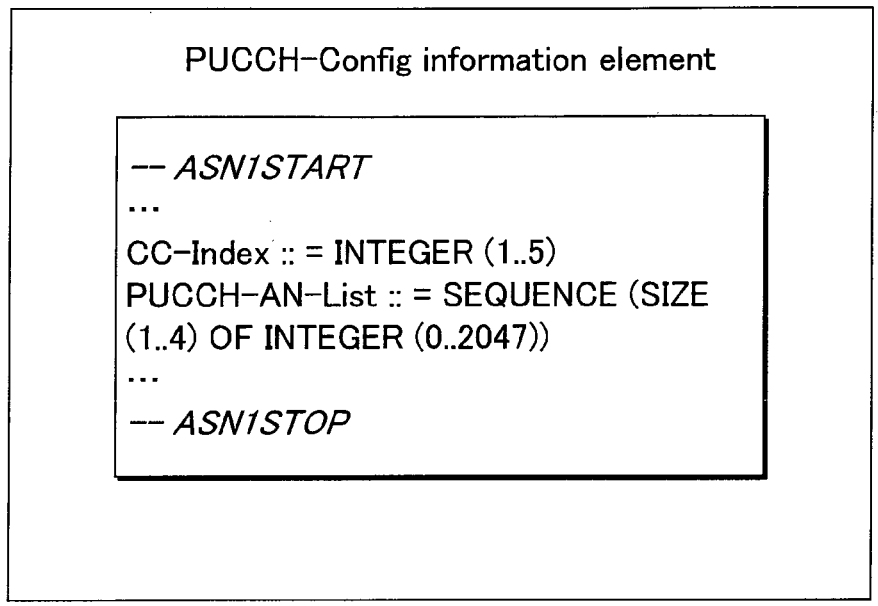
FIG. 4 is an example of a PUCCH configuration information element description according to an embodiment of the present invention.

FIG. 4 is first example of a PUCCH configuration information element description that could be utilized in the signaling process shown in FIG. 3 according to an embodiment of the present invention. In the first example, the contents of a RRC message use ASN.1 (Abstract Syntax Notation One) to specify the message syntax. As shown in FIG. 4, the PUCCH configuration could be indicated by the RRC signaling CC-specifically (Component Carrier-specifically). For example, the information element in PUCCH Configuration RRC signaling includes the component carrier index field (named as CC-Index) and one resource list field (named as PUCCH-AN-List). The value of CC-Index is an integer variable, for example, from 1 to 5, where the integer stands for the component carrier index. For example, CC-Index equals 1 which means this PUCCH configuration RRC signaling is used as the PUCCH configuration for the 1st component carrier. Here the linkage between the component carrier index and the component carrier could be configured cell-specifically by broadcast information (e.g., SIB). Also the linkage between the component carrier index and the component carrier could be configured UE-specifically by the dedicated signaling (e.g., RRC signaling). The PUCCH-AN-List is a sequence consisting of 4 integer variables which indicate the location of 4 PUCCH resource candidates. It is noted that the integer variable indicating the location of PUCCH resource can be set from 0 to 2047. That means the system can set maximum 2048 different PUCCH resource locations on the primary UL CC. Here just gives out an example. Of course, the maximum value could be set according to the real system design.

After one downlink component carrier is activated by the base station 100 via the MAC signaling in Step 301 of FIG. 3, the RRC signaling including information such as shown in FIG. 4 will be transmitted to the user equipment 200. The CC-Index indicates the newly activated downlink component carrier and the PUCCH-AN-List indicates 4 available PUCCH resources on the primary uplink component carrier for the newly activated downlink component carrier.

Figure 5:
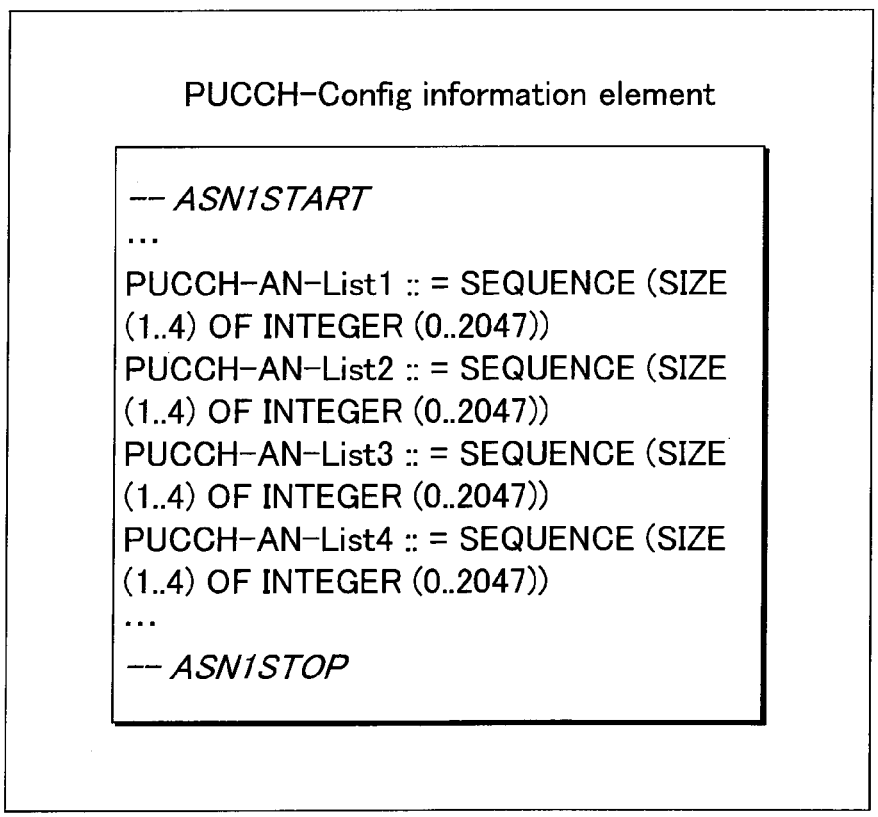
FIG. 5 is an example of another PUCCH configuration information element description according to an embodiment of the present invention.

FIG. 5 is a second example of another PUCCH configuration information element description which could be utilized in the signaling process shown in FIG. 3 according to an embodiment of the present invention. In the second example, the contents of a RRC message also use ASN.1 to specify the message syntax. As shown in FIG. 5, the PUCCH configuration could be indicated by the RRC signalling for all configured downlink component carriers once. For example, the information element in PUCCH Configuration RRC signaling includes four resource list fields (named as PUCCH-AN-List1, PUCCH-AN-List2, PUCCH-AN-List3 and PUCCH-AN-List4). The PUCCH-AN-ListX (X= 1, . . . , 4) is a sequence consisting of 4 integer variables which indicate the location of 4 PUCCH resource candidates. The UE could be configured with maximum 4 non-primary DL CCs. The PUCCH-AN-ListX corresponds to the Xth non-primary DL CC. Here the linkage between the index value X and the non-primary component carrier could be configured cell-specifically by broadcast information (e.g., SIB). Also the linkage between the index X and the non-primary component carrier could be configured UE-specifically by the dedicated signaling (e.g., RRC signaling).

For example, this RRC signalling could be transmitted to the user equipment on the primary downlink component carrier once. The implicit linkage between the PUCCH-AN-List and the activated component carrier could be constructed easily. After one downlink component carrier is activated by the base station via the MAC signaling in Step 301 of FIG. 3, one dedicated PUCCH-AN-List could be deduced to indicate the 4 available PUCCH resources on the primary uplink component carrier for the newly activated downlink component carrier.

As shown in the explanation of FIG. 3, the base station can configure, to the user equipment, parameters for the PUCCH resources by using the RRC signaling. And then, the base station can indicate the PUCCH resource(s) by transmitting, to the user equipment, the PUCCH resource index via PDCCH. The base station can indicate, to the user equipment, the PUCCH resource(s) among the PUCCH resource list. The base station can transmit, to the user equipment, the PUCCH resource index.

In the present invention, the base station 'reuses' DCI format 1A and/or DCI format 1C for transmitting the PUCCH resource index.

In principle, according to a communication method for PUCCH resource assignment in the present invention, a base station 100 transmits a DCI to a user equipment 200 (notifies a DCI from a base station 100 to a user equipment 200); after receiving the DCI, the user equipment 200 determines whether a first predetermined field (or first predetermined fields) is set (arranged) according to a predetermined mode. If the first predetermined field is set according to a predetermined mode, the user equipment 200 will realize (acknowledge) that a second predetermined field (or second predetermined fields) in the received DCI is used for PUCCH resource assignment and thus configures PUCCH resources (i.e. setting PUCCH resources) according to the second predetermined field.

First Embodiment

Figure 6:
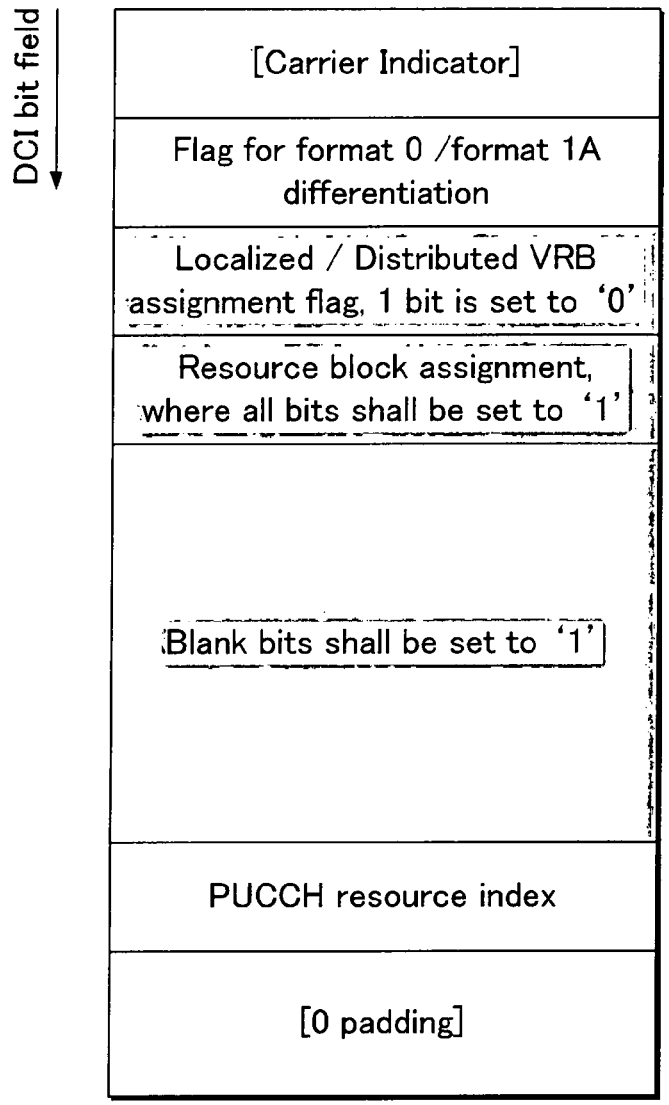
FIG. 6 is a schematic diagram illustrating an example of using DCI format to transmit PUCCH resource index according to first embodiment of the present invention.

FIG. 6 is a schematic example of PUCCH resource index transmitted in DCI format 1A according to the first embodiment of the present invention. In the present embodiment, the base station can set predetermined/specified value(s) on predetermined/specified field(s) in DCI format 1A. In FIG. 6, as an example, the base station sets '0' on the field for Localized/Distributed VRB assignment flag. Also, as an example, the base station sets '1' on the field for Resource block assignment. Also as an example, the base station sets '1' on the Blank field. The blank field could be considered as the Preamble index field and PRACH Mask Index field in the DCI format 1A shown in FIG. 2. In the present embodiment, the base station sets all bits in one predetermined field to the same predetermined value.

Namely, it is specified in advance, between the base station 100 and the user equipment 200, that DCI indicates the PUCCH resource(s) in case that predetermined field(s) is set to predetermined value(s). In FIG. 6, as an example, the field for Localized/Distributed VRB assignment flag is specified as one of first predetermined fields. Also, the field for Resource block assignment is specified as one of first predetermined fields. Also, the Blank field is specified as one of first predetermined fields. The base station 100 and the use equipment 200 realize that DCI format 1A is used for indicating the PUCCH resource(s) in case that these first predetermined fields are set to predetermined value(s) (e.g., set to '0' or '1').

Here, as above explanation, the field for Localized/Distributed VRB assignment flag and the field for Resource block assignment are specified for using for random access procedure initiated by a PDCCH command. Namely, the base station and the user equipment may use the same field as a predetermined/specified field(s) (a first predetermined field) between indication of the PUCCH resource(s) and random access procedure initiated by a PDCCH command.

In an alternative case, some field(s) can be reserved as flag for indication of the PUCCH resource(s) or random access procedure initiated by a PDCCH command differentiation. For example, the base station and the user equipment may use the padding bits field for realizing the indication of the PUCCH resource(s) or random access procedure initiated by a PDCCH command (e.g., all padding bits field is set to '1': indication of the PUCCH resource(s), all padding bits field is set to '0': random access procedure initiated by a PDCCH command).

Namely, the base station and the user equipment can change the interpretation of the second predetermined field(s) according to value(s) of the first predetermined field(s). Here, in FIG. 6, the second predetermined fields are the fields except for the field for Localized/Distributed VRB assignment flag, the field for Resource block assignment and the Blank field. And the first predetermined fields are the field for Localized/Distributed VRB assignment flag, the field for Resource block assignment and the Blank field.

The base station indicates, to the user equipment, the PUCCH resource(s) among the PUCCH resource list configured by transmitting DCI where the first predetermined field(s) is set to predetermined value(s). In this case, as an example, the PUCCH resource index (the second predetermined field) is represented by following 2 bits field (PUCCH resource index field) in Table 1.

TABLE 1

| PUCCH resource index indicator | PUCCH resource index |
|---|---|
| '00' | The first PUCCH resource index configured by the higher layers |
| '01' | The second PUCCH resource index configured by the higher layers |
| '10' | The third PUCCH resource index configured by the higher layers |
| '11' | The fourth PUCCH resource index configured by the higher layers |

In details, if the DCI format 1A includes first predetermined fields in which all bits in the Localized/Distributed VRB field are set to "0", all bits in the Resource block assignment are set to "1" and all bits in the Blank field are set to "1", a PUCCH resource index field (second predetermined field) in this DCI format 1A will indicate PUCCH resource assignment. If in the DCI format 1A, all bits in the Localized/Distributed VRB field are set to "0", all bits in the Resource block assignment are set to "1", but the bits in the Blank field (Preamble Index field and PRACH Mask Index field) are not all set to "1", the DCI format 1A will be realized as indicating a random access procedure initiated by a PDCCH command and in such case, the first predetermined fields are used for transmitting random access parameters (e.g., Preamble Index and PRACH Mask Index).

After receiving the PUCCH resource index via DCI format 1A, the user equipment 200 sets the PUCCH resource(s) on the primary uplink component carrier according to the PUCCH resource index. The user equipment 200 sets the PUCCH resource(s) among the PUCCH resource list configured as parameters for the PUCCH resource configuration by using the RRC signaling.

At the user equipment side, the user equipment 200 uses the C-RNTI to blindly decode DCI format 1A, and then differentiates (realizes) value(s) of the detailed fields in DCI format 1A via different definitions. For example, the user equipment differentiates the scheduling of one PDSCH codeword with other definitions via the field for Localized/Distributed VRB assignment flag and the field for Resource block assignment. Also, the user equipment differentiates the random access procedure initiated by a PDCCH command according to the field for Localized/Distributed VRB assignment flag, the field for Resource block assignment and the Blank Field. Also, the user equipment differentiates the PUCCH resource index indication according to the Blank Field or the padding bits field.

And then, the user equipment feedbacks UCI (HARQ-ACK/NACK or/and CQI and/or scheduling request) on PUCCH resource(s) which is indicated in the DCI format sent by the base station.

In the embodiment shown in FIG. 6, DCI format 1A is reused to indicate between the PUCCH resource assignment and random access procedure initiated by a PDCCH command when the first predetermined fields are set to a predetermined value, i.e., when the first predetermined fields are set according to a predetermined mode. In the present embodiment, the predetermined mode means that all bits in each one of the first predetermined fields are set to the same value (e.g., 0 or 1). However, FIG. 6 is only an example for illustration and the predetermined mode is not limited to the example in FIG. 6.

For example, if the first predetermined field (for example, the blank field) includes 8 bits, the predetermined mode may be defined as that the first half of the first predetermined field bits (4 bits) are set to a predetermined value (for example, the first half bits are set to the same value 1 or 0, or the first half is set to a fixed number combination (for example, 0100)) and the second half of the first predetermined field bits may be set to random values. Also, the predetermined mode may be defined as that the second half of the first predetermined field bits are set to a predetermined value (for example, the second half bits are all set to the same value 1 or 0, or the second half bits are set to a number combination) and the first half of the first predetermined field bits may be set to random values.

Also, the predetermined mode may be defined as that a part of the first predetermined field bits are set to a predetermined value (the same value or a number combination). Also, the predetermined mode may be defined as that a predetermined number of first predetermined field bits are set to a predetermined value (the same value or a number combination). Also, the predetermined mode may be defined as that a bit in a predetermined position in the first predetermined field is set to a predetermined value. Also, the predetermined mode may be defined as that a predetermined number of bits in predetermined positions in the first predetermined field are set to a predetermined value (the same value or a number combination). Also, the predetermined mode may be defined as that the first predetermined field bits are set/arranged in a predetermined pattern (for example, 00110011 or 11001100).

Those skilled in the art would appreciate the base station and the user equipment can in advance define a predetermined mode which could be in various forms. As long as the first predetermined field (fields) is set according to the predetermined mode, the user equipment will acknowledge that the second predetermined field (fields) is used for PUCCH resource assignment. Those skilled in the art would also appreciate that although the DCI format in the first embodiment uses three fields as the first predetermined fields, different number of fields may be used as the first predetermined fields.

Introducing the DCI format definition in FIG. 6 to a carrier aggregation capable system can avoid always reserving one field indicating the PUCCH resource index in the DCI format. Via setting first predetermined/specified field to the dedicated value, different definitions of DCI format 1A can be differentiated easily during one single blind decoding procedure. Meanwhile, the method according to the present invention will not increase any blind decoding number.

Second Embodiment

Figure 7:
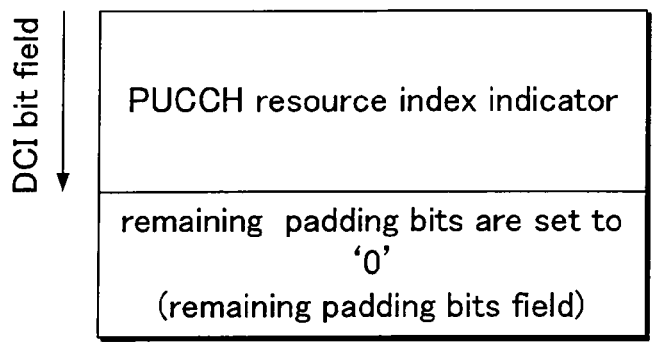
FIG. 7 is a schematic diagram illustrating an example of using DCI format to transmit PUCCH resource index according to second embodiment of the present invention.

FIG. 7 is a schematic example of PUCCH resource index transmitted in DCI format 1X according to second embodiment of the present invention. The size of DCI format 1X is the same as that of DCI format 1C shown in FIG. 2. The remaining padding bits in DCI format 1X are all set to 0. In the present embodiment, the base station can set predetermined value(s) on predetermined field(s) in DCI format 1X. In FIG. 7, as an example, the base station sets '0' on the remaining padding bits field (first predetermined field).

Namely, it is specified, in advance between the base station and the user equipment, that DCI indicates the PUCCH resource(s) in case that first predetermined field(s) is set to predetermined value(s). In FIG. 7, as an example, the field for the remaining padding bits is specified as the first predetermined field. The base station and the use equipment realize that DCI format 1X is used for indicating the PUCCH resource(s) in case that the remaining padding bits field (the first predetermined field) is set to a predetermined value (e.g., set to '0').

Namely, the base station and the user equipment can change the interpretation of the second predetermined field according to the value of the first predetermined field. Here, in FIG. 7, the second predetermined field is the PUCCH resource index indicator field. And the first predetermined field is the field for remaining padding bits.

The base station indicates, to the user equipment, the PUCCH resource(s) among the PUCCH resource list configured by transmitting DCI where the first predetermined field(s) is set to predetermined value(s). In this case, as an example, the PUCCH resource index is represented by 2 bits field (the second predetermined field) shown in above Table 1.

After receiving the PUCCH resource index via DCI format 1X, the user equipment sets the PUCCH resource(s) on the primary uplink component carrier according to the PUCCH resource index. The user equipment sets the PUCCH resource(s) among the PUCCH resource list configured as parameters for the PUCCH resource configuration by using the RRC signaling.

Namely, the user equipment uses the C-RNTI to blindly decode DCI format 1X/1C, and then differentiates (realizes) value(s) of the detailed fields in DCI format 1X/1C via different definitions. For example, the user equipment differentiates the DCI format 1X from DCI format 1C via the remaining padding bits field.

In details, if the DCI format 1X/1C includes the first predetermined field (remaining padding bits field) in which all bits are set to "0", a PUCCH resource index indicator field (second predetermined field) in the DCI format 1X will be used to indicate PUCCH resource assignment. If the bits in the first predetermined field (remaining padding bits field) are not all set to "0", the DCI format will be realized as a DCI format 1C for very compact scheduling of one PDSCH codeword and the first field is used for scheduling of PDSCH.

In case of indicating PUCCH resource index, the user equipment feeds back UCI (HARQ-ACK/NACK or/and CQI and/or scheduling request) on PUCCH resource(s) which indicated by the base station.

The DCI format 1X has the same size as that of DCI format 1C. Consequently, it has a less payload size than that of DCI format 1C. Using DCI format 1X for indicating the PUCCH resource index can save the rare physical resources for PUCCH transmission.

In the present embodiment, bits in the first predetermined field (remaining padding bits field) are set according to a predetermined mode, i.e., all bits are set to the same value "0". However, FIG. 7 is only an example for illustration and the predetermined mode is not limited to the example in FIG. 7.

As described in the first embodiment, the predetermined mode may be defined as that the first half of the first predetermined field bits (4 bits) are set to a predetermined value (for example, set to the same value 1 or 0, or the first half is set to a fixed number combination (for example, 0100)) and the second half of the first predetermined field bits may be set to random values, etc. Alternatively, the predetermined mode may be defined as that a part of the first predetermined field bits are set to a predetermined value. Alternatively, the predetermined mode may be defined as that a part of bits in predetermined positions in the first predetermined field are set to a predetermined value.

Third Embodiment

As explanation in the FIG. 3, the base station can configure, to the user equipment, parameters for the PUCCH resources by using the RRC signaling. And then, the base station can indicate the PUCCH resource(s) by transmitting, to the user equipment, the PUCCH resource index via PDCCH. The base station can indicate, to the user equipment, the PUCCH resource(s) among the PUCCH resource list. The base station can transmit, to the user equipment, the PUCCH resource index indicator.

In the present embodiment, in step 303 of FIG. 3, the TPC command for PUCCH field in currently existed DCI formats (e.g., DCI format 1A (compact DCI format 1A)) could be reused to transmit the PUCCH resource index indicator.

Figure 8:
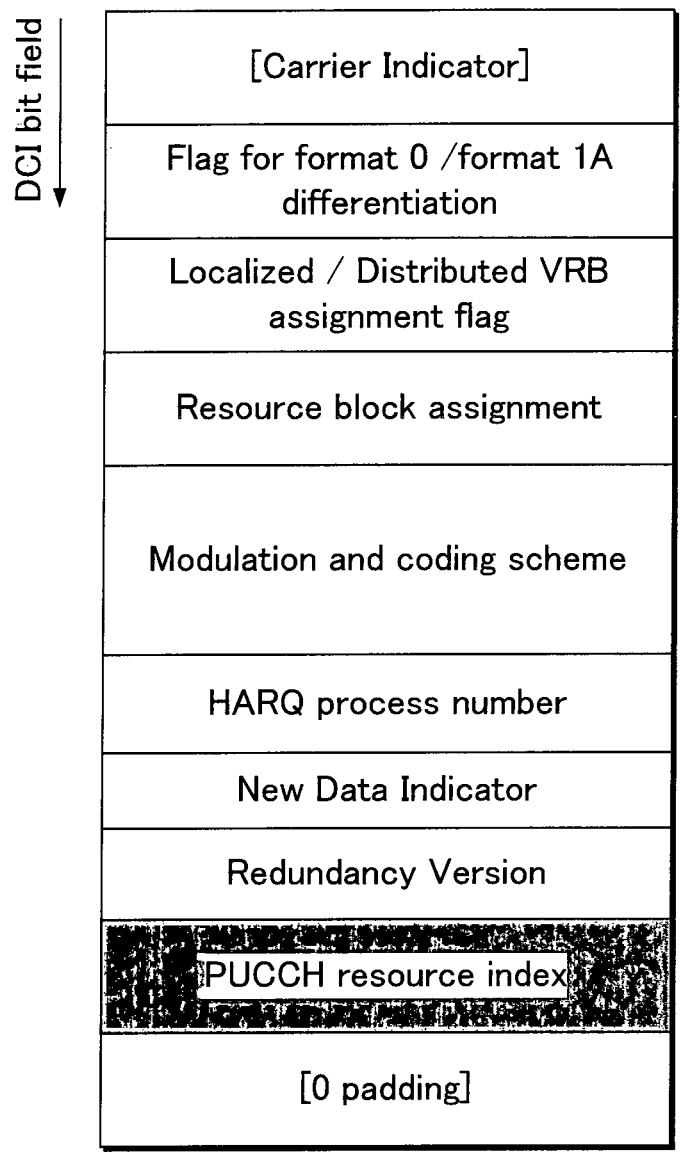
FIG. 8 is a schematic diagram illustrating an example of using DCI format to transmit PUCCH resource index according to third embodiment of the present invention.

FIG. 8 is a schematic example of PUCCH index indicator transmitted in DCI format 1A according to the third embodiment of the present invention. As shown in FIG. 8, this DCI format 1A for PUCCH index indication can only be used for the compact scheduling of one PDSCH codeword scheduled on non-primary component carriers. The base station can only use this DCI format 1A for PUCCH index indication only in case of the scheduling of PDSCH on non-primary component carrier. In this DCI format, the TPC command for PUCCH field is reused to transmit the PUCCH resource index indicator. Namely, the user equipment can realize whether the DCI is for primary component carrier, or the DCI is for non-primary component carrier. The user equipment interprets the field(s) (second predetermined field) as the TPC command for PUCCH field in case that primary downlink component carrier is scheduled (e.g.; PDSCH is assigned on primary downlink component carrier) by DCI format 1A (i.e., the first predetermined field (carrier indicator field) indicates the primary downlink component carrier). Also, the user equipment interprets the field(s) (second predetermined field) as PUCCH resource index indicator in case that non-primary downlink component carrier is scheduled (e.g.; PDSCH is assigned on non-primary downlink component carrier) by DCI format 1A.

Note that if the user equipment is only scheduled on the primary downlink component carrier, the PUCCH resource is implicitly indicated from PDCCH CCE index, which is totally compatible with that in LTE Rel-8. Otherwise, if the user equipment is scheduled on at least one non-primary downlink component carrier, the corresponding PUCCH resource on the primary uplink component carrier will be explicitly indicated by the PUCCH resource index indicator of DCI format for the PDSCH assignment on the non-primary component carrier.

While the user equipment is scheduled, in a subframe, on multiple non-primary downlink component carriers (i.e., PDSCHs are assigned on multiple non-primary downlink component carriers), the PUCCH resource index indicator of DCI format for the PDSCH assignment on each non-primary component carrier indicates the same PUCCH resource. In this scenario, the PUCCH resource on the primary uplink component carrier could be indicated correctly via the PUCCH resource index indicator of DCI format for the PDSCH assignment on any non-primary component carrier. That means the user equipment could obtain the correct PUCCH resource to feedback UCI (HARQ-ACK/NACK or/and CQI and/or scheduling request) even if PDCCH on some component carriers is not received correctly.

In this case, as an example, the PUCCH resource index indicator is represented by following 2 bits field in Table 2.

TABLE 2

PUCCH Resource Index

| PUCCH resource index indicator | PUCCH resource index |
|---|---|
| '00' | The first PUCCH resource index configured by the higher layers |
| '01' | The second PUCCH resource index configured by the higher layers |
| '10' | The third PUCCH resource index configured by the higher layers |
| '11' | The fourth PUCCH resource index configured by the higher layers |

In details, referring to FIG. 8, in case that the primary CC is represent as "000" and the non-primary CC is represented as one of "001-004", if the first predetermined field (carrier indicator field) includes bits "000", the user equipment will realize that the second predetermined field (TPC command for PUCCH field) is used as TPC command for PUCCH. If the first predetermined field (carrier indicator field) includes bits (i.e., the bits are set according to a predetermined mode), for example, "001", the user equipment will realize that the second predetermined field (PUCCH resource index field) is used as PUCCH resource index indicator.

After receiving the PUCCH resource index indicator via DCI format 1A, the user equipment sets the PUCCH resource(s) on the primary uplink component carrier according to the PUCCH resource index indicator. The user equipment sets the PUCCH resource(s) among the PUCCH resource list configured as parameters for the PUCCH resource configuration by using the RRC signaling.

Namely, the user equipment uses the C-RNTI to blindly decode DCI format 1A, and then differentiates (realizes) value(s) of the detailed fields in DCI format 1A via different definitions. For example, the user equipment differentiates DCI format 1A scheduling on non-primary component carrier(s) from DCI format 1A scheduling on primary component carrier via, for example, the field(s) for indicating the component carrier where the base station schedules (carrier indicator field(s)-first predetermined field).

And then, the user equipment feeds backs UCI (HARQ-ACK/NACK or/and CQI and/or scheduling request) on PUCCH resource(s) which indicated by the base station.

For the case that the user equipment does not receive the TPC command for PUCCH on the primary downlink component carrier (e.g., no PDSCH assignment or error PDCCH detection on primary downlink component carrier), some action should be pre-defined. One example is that the user equipment could reuse the TPC command for PUCCH received on latest scheduled subframe for current scheduled subframe. Another example is that setting TPC command for PUCCH to a default value for current scheduled subframe, e.g., setting TPC command for PUCCH to a value to keep the current power level unchanged.

As shown in the example of FIG. 8, in case of indicating PUCCH resource assignment, the first predetermined field (the carrier indicator field) is set according to a predetermined mode, i.e., the carrier indicator field bits are set to correspond to a non-primary component carrier and thus set to a predetermined value indicating any non-primary component carrier.

The DCI format in FIG. 8 can transmit the resource block assignment of PDSCH and the PUCCH resource index indicator in one PDCCH signaling. According to such PUCCH assignment, it can designate different PUCCH resources for the scheduled PDSCH subframe by subframe and realize the dynamic PUCCH resource assignment among the PUCCH resource candidates signaled via the RRC signaling. The base station can perform flexible assignment in case of carrier aggregation compared to the semi-static PUCCH resource assignment.

According to the present invention, the base station can perform flexible resource assignment for PUCCH transmission in case of carrier aggregation. Therefore, it is possible for the base station to perform more efficient transmission control (scheduling) without causing additional complexity in the system.

<Mobile Communication System>

In the following descriptions, a mobile communication system according to the present invention will be described. The mobile communication system includes a base station and user equipment and the base station and user equipment may communicate with each other according to the method for PUCCH resource assignment in any above embodiment or its variation example.

Figure 9:
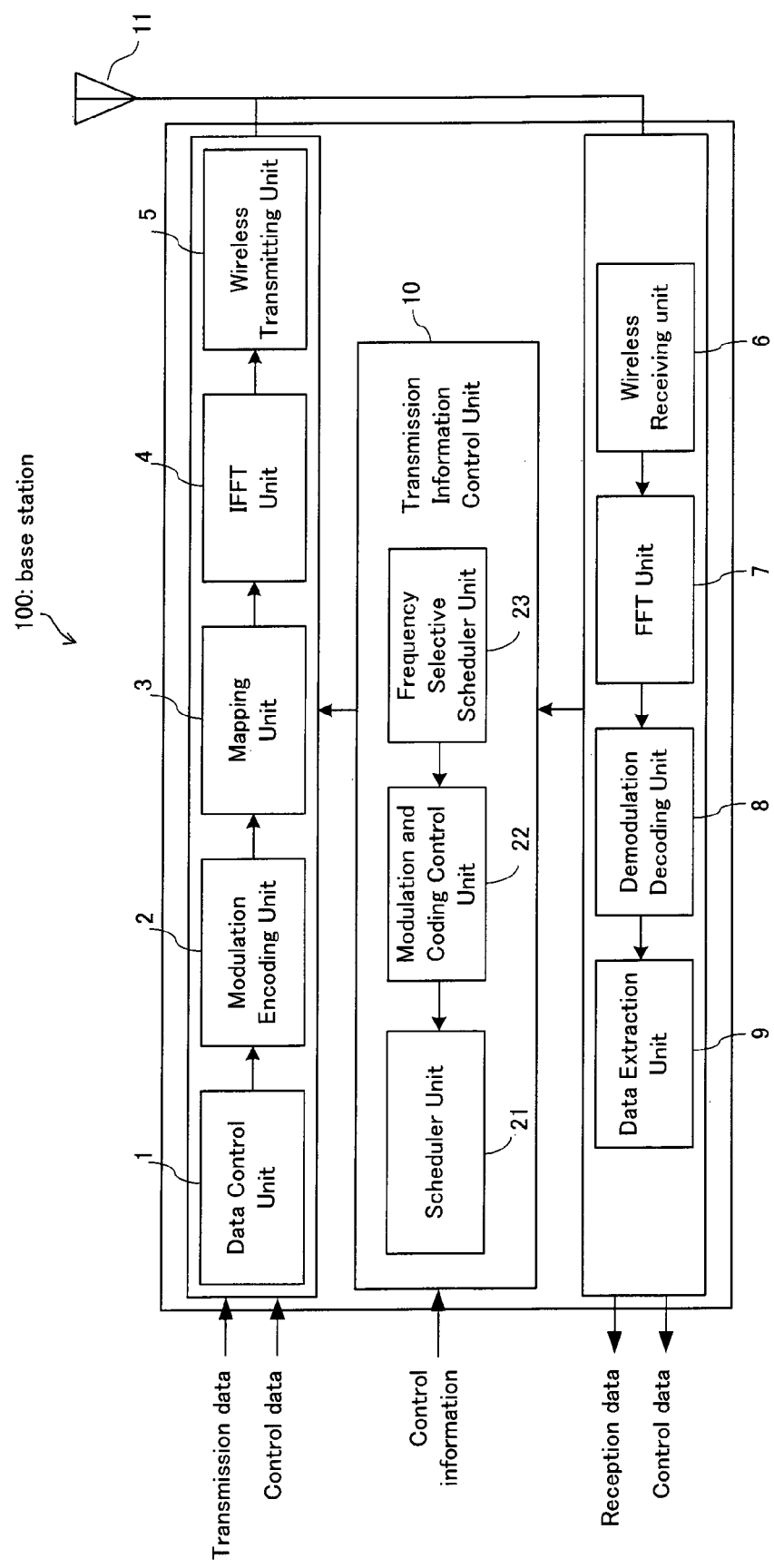
FIG. 9 is a functional block diagram showing a schematic configuration example of a base station according to an embodiment of the present invention.

FIG. 9 is a functional block diagram showing a schematic configuration example of a base station according to the present invention.

As shown in FIG. 9, a base station 100 comprises a data control unit 1, a modulation encoding unit 2, a mapping unit 3, an inverse fast Fourier transform (IFFT) unit 4, a wireless transmitting unit 5, a wireless receiving unit 6, a fast Fourier transform (FFT) unit 7, a demodulation decoding unit 8, a data extraction unit 9, a transmission information control unit 10, and an antenna 11. The transmission information control unit 10 includes a scheduler unit 21, a modulation and coding control unit 22, and a frequency selective scheduler unit 23.

In the base station 100, transmission data and control data to be transmitted to user equipment is inputted to the data control unit 1, and the data is sequentially transmitted to the user equipment according to an instruction from the transmission information control unit 10. The modulation encoding unit 2 performs a modulation processing or an error correction coding processing upon a signal outputted from the data control unit 1 based on modulation scheme and coding rate determined by the transmission information control unit 10 (modulation and coding control unit 22) and outputs the data to the mapping unit 3. The mapping unit 3 maps the data outputted from the modulation encoding unit 2 on each sub-carrier based on frequency selective scheduling information outputted from the transmission information control unit 10 (frequency selective scheduler unit 23) and outputs the data to the inverse fast Fourier transform unit 4.

The inverse fast Fourier transform unit 4 performs a processing of inverse fast Fourier transform upon the data outputted from the mapping unit 3, converts the data to a time-series base-band digital signal, and outputs the signal to the wireless transmitting unit 5. The wireless transmitting unit 5 performs digital/analog conversion of the output signal from the inverse fast Fourier transform unit 4, up-converts the signal to a frequency suitable for transmission, and then transmits the signal to each user equipment through the antenna 11.

The scheduler unit 21 schedules the downlink and the uplink based on control information, such as a resource region that each user equipment may use, an intermittent transmission reception cycle, a format of transmission data channel and a buffer status. The modulating and coding control unit 22 determines the modulation scheme and the coding rate to be applied to each data based on the channel quality information feedback on the physical uplink control channel from the user equipment. The frequency selective scheduler unit 23 executes a processing of frequency selective scheduling to be applied to each data based on the channel quality information feedback from the user equipment. The data extraction unit 9 separates demodulated and decoded data into reception data for user and control data, transfers the data to a superior processing unit, and outputs the data to the transmission information control unit 27.

As shown in FIG. 9, the various components of the base station may be coupled together or implemented as separate units.

According to the communication system shown in FIG. 9, a base station 100 (the transmission information control unit 10) transmits a DCI to a user equipment 200. In case of indicating PUCCH resource assignment, the transmission information control unit 10 (DCI reuse unit) in the base station 100 sets (arranges) a first predetermined field (or first predetermined fields) in the DCI according to a predetermined mode and sets information for PUCCH resource assignment (PUCCH resource index) in a second predetermined field. In case of transmitting DCI for downlink, the transmission information control unit 10 sets fields in the DCI as well known in the art. After the DCI format is generated, it will be notified to the user equipment 200 through the antenna 11 (notifying unit).

Figure 10:
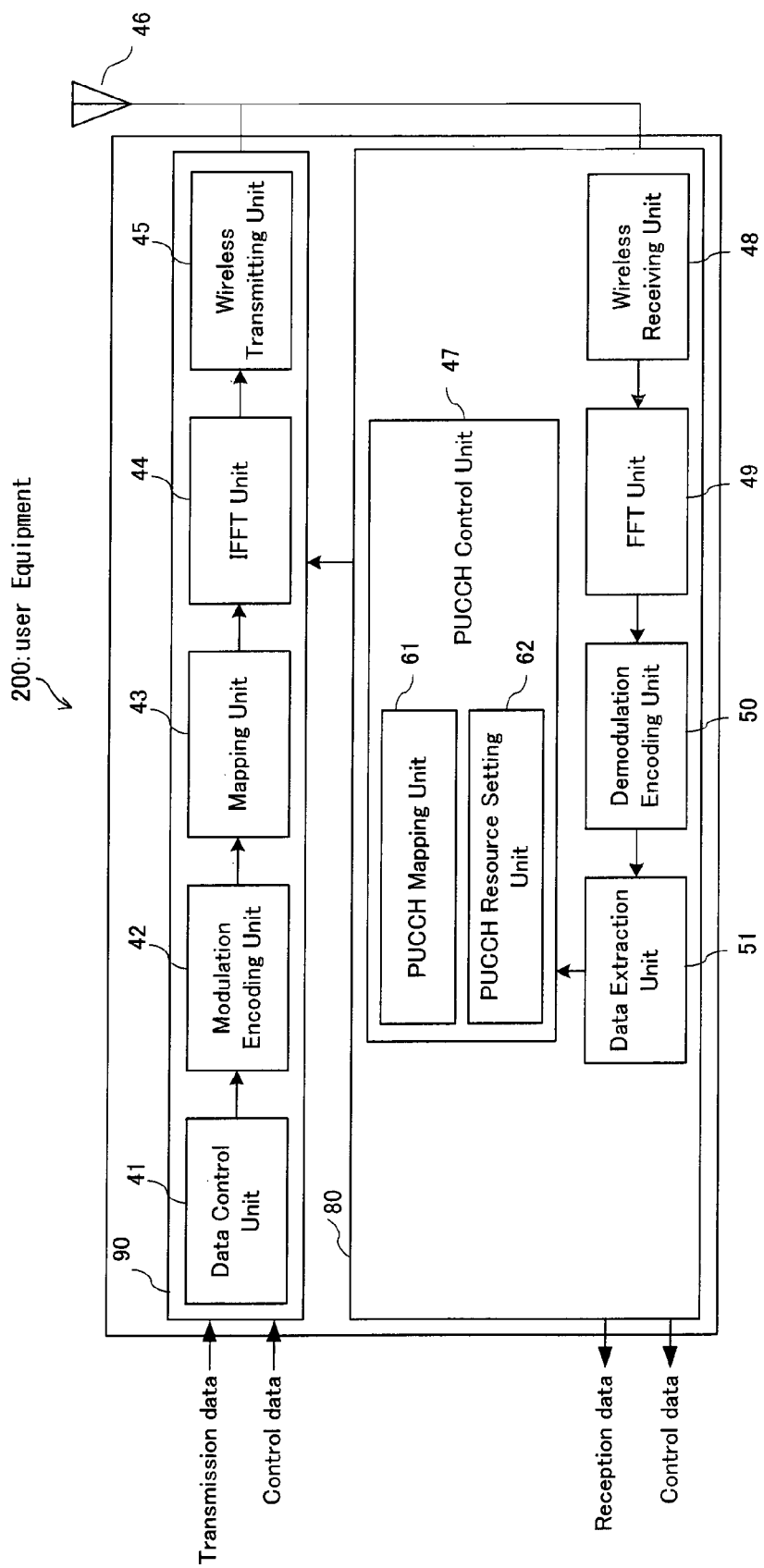
FIG. 10 is a functional block diagram showing a schematic configuration example of user equipment according to an embodiment of the present invention.

FIG. 10 is a functional block diagram showing a schematic configuration example of user equipment according to the present invention.

As shown in FIG. 10, a user equipment 200 comprises a data control unit 41, a modulation encoding unit 42, a mapping unit 43, an inverse fast Fourier transform (IFFT) unit 44, a wireless transmitting unit 45, an antenna 46, a PUCCH control unit 47, a wireless receiving unit 48, a fast Fourier transform (FFT) unit 49, a demodulation decoding unit 50 and a data extraction unit 51. The PUCCH control unit 47 comprises a PUCCH resource setting unit 62 and a PUCCH mapping unit 61.

The wireless receiving unit 48, the FFT unit 49, the demodulation decoding unit 50, the data extraction unit 51, and the PUCCH control unit 47 constitute a receiving unit 80 as a whole, and the data control unit 41, the modulation encoding unit 42, the mapping unit 43, the inverse fast Fourier transform (IFFT) unit 44, and the wireless transmitting unit 45 constitute a transmitting unit 90 as a whole.

In the user equipment 200 shown in FIG. 10, transmission data and control data to be transmitted to the base station 100 are inputted to the data control unit 41, and the data is sequentially transmitted to the base station 100. The modulation encoding unit 42 performs a modulation processing or an error correction coding processing upon a signal outputted from the data control unit 41 and outputs the data to the mapping unit 43. The mapping unit 43 maps the data outputted from the modulation encoding unit 42 on each sub-carrier and outputs the data to the inverse fast Fourier transform unit 44.

The inverse fast Fourier transform unit 44 performs a processing of inverse fast Fourier transform upon a symbol sequence outputted from the mapping unit 43, converts the symbol sequence to a time-series base-band digital signal, and outputs the signal to the wireless transmitting unit 45. The wireless transmitting unit 45 performs digital/analog conversion to the output signal from the inverse fast Fourier transform unit 44, up-converts the signal to a frequency suitable for transmission, and then transmits the signal to the base station 100 through the antenna 46.

The PUCCH resource setting unit 62 sets the physical PUCCH resource of the newly activated downlink component carrier according to the configuration signaling (PUCCH configuration parameters via RRC signaling and PUCCH resource index via PDCCH signaling) received from the base station 100. The PUCCH mapping unit 61 maps the HARQ-ACK/NACK and/or CQI to the physical PUCCH resource set by the PUCCH resource setting unit 62.

According to the user equipment 200 shown in FIG. 10, after the antenna 46 (receive unit) receives the DCI format, the PUCCH control unit 47 (determination unit) analyzes and determines whether a first predetermined field (or first predetermined fields) is set (arranged) according to a predetermined mode. If the first predetermined field is set according to a predetermined mode, the user equipment 200 will realize (acknowledge) that a second predetermined field (or second predetermined fields) is used for PUCCH resource assignment and thus the PUCCH control unit 47 (setting unit) configures (sets) PUCCH resources according to the second predetermined field. If the first filed is not set according to a predetermined mode, the user equipment will realize that the received DCI is used for downlink and thus process it in a predetermined way, which is known in the art, for example, for downlink resource assignment.

The antenna 46 also receives parameters include physical uplink control channel candidate resource list from the base station 100 and the PUCCH control unit 47 sets physical uplink control channel resources among the physical uplink control channel candidate resource list.

In another alternative example of the base station in FIG. 9 and the user equipment in FIG. 10, the device (BS or UE) may be implemented to include a processor and a memory.

The memory, which may include both read-only memory (ROM) and random access memory (RAM), provides instructions and data to the processor. A portion of the memory may also include non-volatile random access memory (NVRAM). The memory may include any electronic component capable of storing electronic information, and may be embodied as ROM, RAM, magnetic disk storage media, optical storage media, flash memory, on-board memory included with the processor, EPROM memory, EEPROM memory, registers, a hard disk, a removable disk, a CD-ROM, etc. The memory may store program instructions and other types of data. The program instructions may be executed by the processor to implement some or all of the methods disclosed herein so as to realize the PUCCH resource assignment.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic elements, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration. In an alternative embodiment, integrated circuits may be adopt to store programs which realizes the methods at the base station and/or the user equipment when being executed, and the integrated circuits may be mounted on the base station and the user equipment respectively.

According to the present invention, an integrated circuit mounted in a user equipment which physical uplink control channel (PUCCH) resources are assigned to may be provided. The integrated circuit comprises logic element (receive logic element) for receiving downlink control information from a base station; logic element (determination logic element) for determining whether the DCI is used for PUCCH resource assignment based on a first predetermined field in the DCI, wherein, the determination unit determines that the DCI is used for PUCCH resource assignment if the first predetermined field is set according to a predetermined mode; and logic element (setting logic element) for setting PUCCH resources according to a second predetermined field in the DCI if the determination unit determines that the DCI is used for PUCCH resource assignment.

According to the present invention, an integrated circuit mounted in a base station for assigning physical uplink control channel (PUCCH) resources to a user equipment may be also provided. The integrated circuit comprises: logic element (setting logic element) for setting a first predetermined field in a DCI according to a predetermined mode and setting PUCCH resource assignment index in a second predetermined field when the DCI is used for indicating PUCCH resource assignment; and logic element (notification logic element) for notifying the DCI to the user equipment.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

According to an embodiment of the present invention, there is provided a communication method for physical uplink control channel (PUCCH) resource assignment. The method comprises: notifying a downlink control information (DCI) from a base station to a user equipment, and after receiving the DCI, determining, by the user equipment, whether the DCI is used for PUCCH resource assignment based on a first predetermined field in the DCI, wherein, if the first predetermined field is set according to a predetermined mode, the user equipment setting PUCCH resources according to a second predetermined field in the DCI.

According to another embodiment of the present invention, there is provided a user equipment which physical uplink control channel (PUCCH) resources are assigned to. The user equipment comprises a receive unit receiving downlink control information from a base station, a determination unit determining whether the DCI received by the receive unit is used for PUCCH resource assignment based on a first predetermined field in the DCI, wherein, the determination unit determines that the DCI is used for PUCCH resource assignment if the first predetermined field is set according to a predetermined mode, and a setting unit setting PUCCH resources according to a second predetermined field in the DCI received by the receive unit if the determination unit determines that the DCI is used for PUCCH resource assignment.

According to another embodiment of the present invention, there is provided a base station for assigning physical uplink control channel (PUCCH) resources to a user equipment. The base station comprises a downlink control information (DCI) reuse unit setting a first predetermined field in a DCI according to a predetermined mode and setting PUCCH resource assignment index in a second predetermined field when the DCI is used for indicating PUCCH resource assignment, and a notifying unit notifying the DCI set by the DCI reuse unit to the user equipment.

According to another embodiment of the present invention, there is provided a communication system for physical uplink control channel (PUCCH) resource assignment. The system comprises: a base station notifying a downlink control information (DCI), and a user equipment receiving the DCI, determining, whether the received DCI is used for PUCCH resource assignment based on a first predetermined field in the DCI after receiving the DCI from the base station, and if the first predetermined field is set according to a predetermined mode, setting PUCCH resources according to a second predetermined field in the received DCI.

According to another embodiment of the present invention, there is provided an integrated circuit mounted in a user equipment which physical uplink control channel (PUCCH) resources are assigned to. The integrated circuit comprises: receive logic element for receiving downlink control information from a base station, determination logic element for determining whether the DCI received by the receive logic element is used for PUCCH resource assignment based on a first predetermined field in the DCI, wherein, the determination unit determines that the DCI is used for PUCCH resource assignment if the first predetermined field is set according to a predetermined mode, and logic element for setting PUCCH resources according to a second predetermined field in the DCI received by the receive logic element if the determination unit determines that the DCI is used for PUCCH resource assignment.

According to another embodiment of the present invention, there is provided an integrated circuit mounted in a base station for assigning physical uplink control channel (PUCCH) resources to a user equipment. The integrated circuit comprises: setting logic element for setting a first predetermined field in a DCI according to a predetermined mode and setting PUCCH resource assignment index in a second predetermined field when the DCI is used for indicating PUCCH resource assignment, and notification logic element for notifying the DCI set by the setting logic element to the user equipment.

According to another embodiment of the present invention, the base station can perform flexible resource assignment for PUCCH transmission in case of carrier aggregation, thus leading to more efficient transmission control (scheduling) between the base station and the user equipment.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

INDUSTRIAL APPLICABILITY

The present invention is applicable to any systems such as Third Generation (3G), Super Third Generation (S3G), Fourth Generation (4G) cellular mobile communication and digital televisions, wireless local area network (WLAN), self-organized network (Mesh, Ad Hoc, Censor Network), electronic home (e-Home) network, wireless wide area network (WWAN), and etc.

The invention claimed is:

1. A base station apparatus which is configured to communicate with a user equipment on a plurality of downlink component carriers and a first uplink component carrier, the plurality of downlink component carriers including a first downlink component carrier and a plurality of second downlink component carriers, the base station apparatus comprising:
   a transmitting unit configured to transmit, to the user equipment, a higher layer signal including four values of four physical uplink control channel resources, the four values being among integer values and respectively indicating the physical uplink control channel resources configurable on the first uplink component carrier;
   a scheduling circuitry configured to indicate, based on a value of a field of a transmission power control command for a physical uplink control channel, to the user equipment, a single value of a physical uplink control channel resource, the single value of the physical uplink control channel resource being among the four values of the four physical uplink control channel resources; and
   a receiving unit configured to receive, from the user equipment, Hybrid Automatic Repeat Request (HARQ) control information using a physical uplink control channel resource corresponding to the indicated single value of the physical uplink control channel resource, wherein
   the same single value of the physical uplink control channel resource is indicated, among the four values of the four physical uplink control channel resources, by the value of the field of the transmission power control command for the physical uplink control channel included in each downlink control information format in a sub-frame, the each downlink control information format being used for scheduling of a physical downlink shared channel transmission on the second downlink component carrier.

2. The base station apparatus according to claim 1, wherein
   the downlink control information format is transmitted on a physical downlink control channel.

3. The base station apparatus according to claim 1, wherein
   the HARQ control information includes information indicating a positive acknowledgement or a negative acknowledgment for a downlink transport block.

4. A user equipment which is configured to communicate with a base station apparatus on a plurality of downlink component carriers and a first uplink component carrier, the plurality of downlink component carriers including a first downlink component carrier and a plurality of second downlink component carriers, the user equipment comprising:
   a receiving unit configured to receive, from the base station apparatus, a higher layer signal including four values of physical uplink control channel resources, the four values being among integer values and respectively indicating the physical uplink control channel resources configurable on the first uplink component carrier;
   a determining circuitry configured to determine, based on a value of a field of a transmission power control command for a physical uplink control channel, a single value of a physical uplink control channel resource, the single value of the physical uplink control channel resource being among the four values of the four physical uplink control channel resources; and a transmitting unit configured to transmit, to the base station apparatus, Hybrid Automatic Repeat Request (HARQ) control information using a physical uplink control channel resource corresponding to the determined single value of the physical uplink control channel resource, wherein the same single value of the physical uplink control channel resource is indicated, among the four values of the four physical uplink control channel resources, by the value of the field of the transmission power control command for the physical uplink control channel included in each downlink control information format in a sub-frame, the each downlink control information format being used for scheduling of a physical downlink shared channel transmission on the second downlink component carrier.

5. The user equipment according to claim 4, wherein the downlink control information format is transmitted on a physical downlink control channel.

6. The user equipment according to claim 4, wherein the HARQ control information includes information indicating a positive acknowledgement or a negative acknowledgment for a downlink transport block.

7. An integrated circuit mounted in a base station apparatus which is configured to communicate with a user equipment on a plurality of downlink component carriers and a first uplink component carrier, the plurality of downlink component carriers including a first downlink component carrier and a plurality of second downlink component carriers, the integrated circuit comprising:

a logic circuitry configured to transmit, to the user equipment, a higher layer signal including four values of four physical uplink control channel resources, the four values being among integer values and respectively indicating the physical uplink control channel resources configurable on the first uplink component carrier;

a logic circuitry configured to indicate, based on a value of a field of a transmission power control command for a physical uplink control channel, to the user equipment, a single value of a physical uplink control channel resource, the single value of the physical uplink control channel resource being among the four values of the four physical uplink control channel resources; and a logic circuitry configured to receive, from the user equipment, Hybrid Automatic Repeat Request (HARQ) control information using a physical uplink control channel resource corresponding to the indicated single value of the physical uplink control channel resource, wherein the same single value of the physical uplink control channel resource is indicated, among the four values of the four physical uplink control channel resources, by the value of the field of the transmission power control command for the physical uplink control channel included in each downlink control information format in a sub-frame, the each downlink control information format being used for scheduling of a physical downlink shared channel transmission on the second downlink component carrier.

8. The integrated circuit according to claim 7, wherein the downlink control information format is transmitted on a physical downlink control channel.

9. The integrated circuit according to claim 7, wherein the HARQ control information includes information indicating a positive acknowledgement or a negative acknowledgment for a downlink transport block.

10. An integrated circuit mounted in a user equipment which is configured to communicate with a base station apparatus on a plurality of downlink component carriers and a first uplink component carrier, the plurality of downlink component carriers including a first downlink component carrier and a plurality of second downlink component carriers, the integrated circuit comprising:

a logic circuitry configured to receive, from the base station apparatus, a higher layer signal including four values of four physical uplink control channel resources, the four values being among integer values and respectively indicating the physical uplink control channel resources configurable on the first uplink component carrier;

a logic circuitry configured to determine, based on a value of a field of a transmission power control command for a physical uplink control channel, a single value of a physical uplink control channel resource, the single value of the physical uplink control channel resource being among the four values of the four physical uplink control channel resources; and a logic circuitry configured to transmit, to the base station apparatus, Hybrid Automatic Repeat Request (HARQ) control information using a physical uplink control channel resource corresponding to the determined single value of the physical uplink control channel resource, wherein the same single value of the physical uplink control channel resource is indicated, among the four values of the four physical uplink control channel resources, by the value of the field of the transmission power control command for the physical uplink control channel included in each downlink control information format in a sub-frame, the each downlink control information format being used for scheduling of a physical downlink shared channel transmission on the second downlink component carrier.

11. The integrated circuit according to claim 10, wherein the downlink control information format is transmitted on a physical downlink control channel.

12. The integrated circuit according to claim 10, wherein the HARQ control information includes information indicating a positive acknowledgement or a negative acknowledgment for a downlink transport block.

\* \* \* \* \*